United States Patent [19]

Fukushi

[11] Patent Number: 5,418,548
[45] Date of Patent: May 23, 1995

[54] TERMINAL FOR DIGITAL NETWORK AND METHOD OF CONTROLLING THE SAME

[75] Inventor: Kazuhito Fukushi, Tokyo, Japan

[73] Assignee: Fuji Photo Film Co., Ltd., Kanagawa, Japan

[21] Appl. No.: 968,495

[22] Filed: Oct. 29, 1992

[30] Foreign Application Priority Data

Oct. 30, 1991 [JP] Japan .................................. 3-310115

[51] Int. Cl.⁶ .............................................. G09G 3/02
[52] U.S. Cl. .................................. 345/145; 345/146; 345/1; 364/188
[58] Field of Search .................... 345/1, 2, 156, 157, 345/161, 163, 167, 145, 146; 364/188; 395/155

[56] References Cited

U.S. PATENT DOCUMENTS 5,168,269 12/1992 Harlan .................................. 340/711

FOREIGN PATENT DOCUMENTS 404000491 1/1992 Japan .................................. 340/717

OTHER PUBLICATIONS

Translation of Japanese Kokai Application No. Hei 4 [1992]-491; Yamagishi (JP. 404000491); Jan. 6, 1992.

*Primary Examiner*—Ulysses Weldon
*Assistant Examiner*—Matthew Luu

[57] ABSTRACT

The position of a first pointer displayed on a display screen of a monitor display device is designated by a mouse. Data representing the position of a second pointer transmitted through an integrated digital service network 40 is received, and the position thereof is detected. In order to display the first and second pointers on the monitor display device, luminance data and chrominance data representing images of the pointers are generated by a character generator. The above data and image data stored in an image memory are synthesized in an image synthesizing circuit and an image obtained by the synthesis is applied to the monitor display device, so that the first and second pointers are displayed on the display screen of the monitor display device. Consequently, the first pointer designated by an operator of a terminal on the image data receiving side and the second pointer designated by an operator of a terminal on the image data transmission side are simultaneously displayed on the monitor display device.

10 Claims, 3 Drawing Sheets

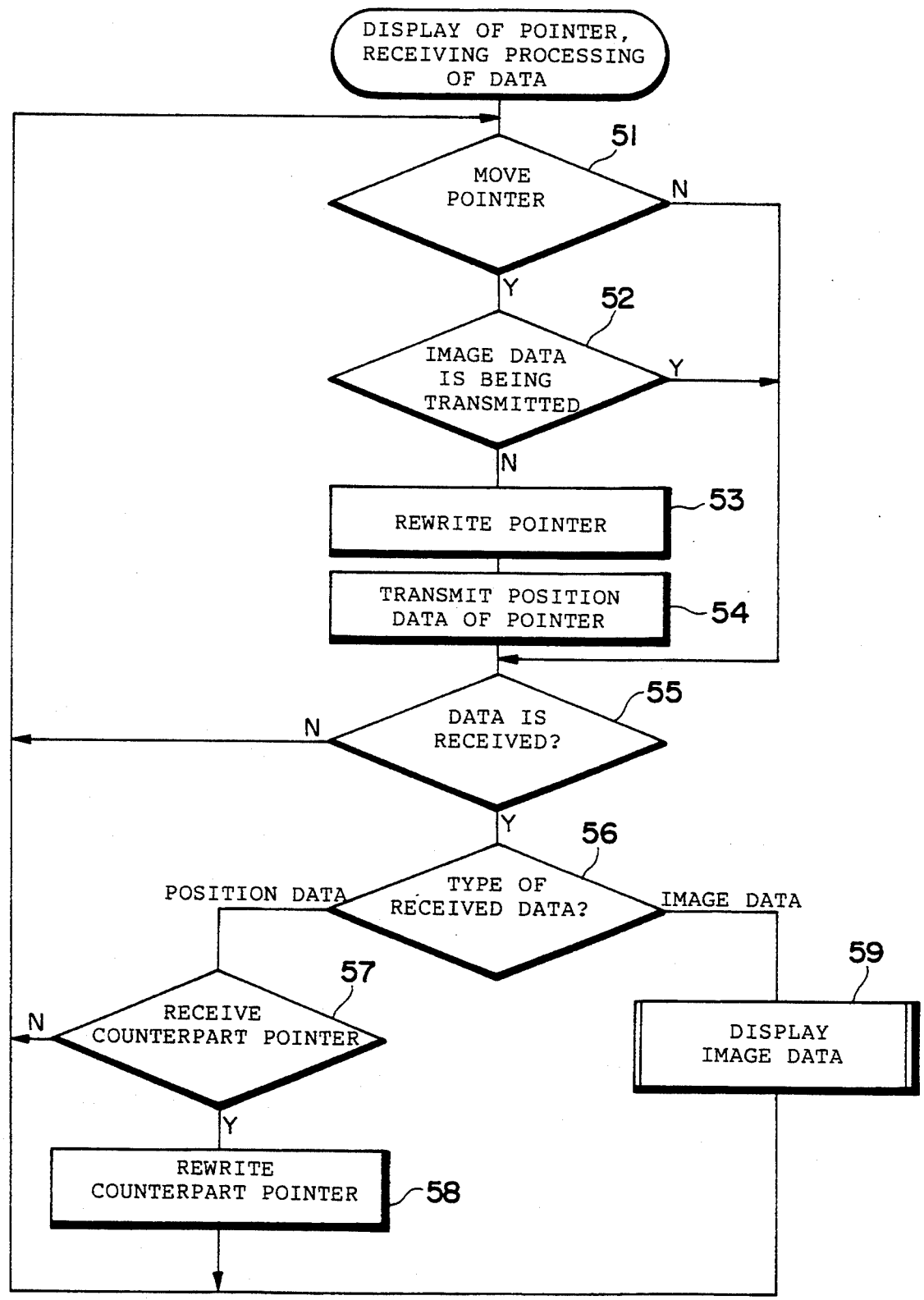

TERMINAL FOR DIGITAL NETWORK AND METHOD OF CONTROLLING THE SAME

BACKGROUND OF THE INVENTION

1. Field of the Invention

The present invention relates to a terminal connected to a digital network such as an ISDN (Integrated Services Digital Network) and a method of controlling the same.

2. Description of the Background Art

An ISDN has the advantages of permitting communication of high quality, for example, withstanding noise and crosstalk and easily performing communication processing because of a strong affinity for a computer. Accordingly, the ISDN can be utilized for communication of not only voice or speech but also various data including image data.

It is considered that an image is displayed on a display device, and a conversation is carried out while watching the display screen of the display device, during communication of image data using the ISDN. In this case, it is desirable that a pointer can be displayed on the display screen because it is possible to carry on a conversation while viewing the pointer displayed and confirming the position designated by the pointer.

SUMMARY OF THE INVENTION

An object of the present invention is to make it possible to display both a pointer controlled by an operator of a terminal on the data transmission side and a a pointer controlled by an operator of a terminal on the data receiving side on a display screen of a display device, both of the pointers being overlapped on the image.

A terminal for a digital network according to the present invention is characterized by having a display device for displaying on a display screen both a first mark and a second mark for designating the positions on the display screen as well as an image, an input device for inputting first position data representing the position of the first mark on the display screen of the display device, first image data generating means for generating image data for displaying the first mark on the display screen of the display device based on the inputted first position data, receiving means for receiving image data of one frame and second position data representing the position of the second mark on the display screen of the display device which are transmitted through the digital network, second image data generating means for generating image data for displaying the second mark on the display screen of the display device based on the received second position data, and image data synthesizing means for synthesizing the image data of one frame, the image data for displaying the first mark, and the image data for displaying the second mark and displaying an image obtained by the synthesis as a composite image on the display device.

A method of controlling a terminal for a digital network according to the present invention is characterized by including the steps of accepting first position data inputted and representing the position of a first mark on a display screen of a display device, generating image data for displaying the first mark on the display screen of the display device based on the inputted first position data, receiving image data of one frame and second position data representing the position of a second mark on the display screen of the display device which are transmitted through the digital network, generating image data for displaying the second mark on the display screen of the display device based on the received second position data, and synthesizing the above-mentioned image data of one frame, the image data for displaying the first mark, and the image data for displaying the second mark and outputting an image obtained by the synthesis so as to dislay the composite image on the display device.

It is preferable that the first mark and the second mark differ in shape or color. In addition, it is preferable that the first mark and the second mark are displayed on the display screen of the above-mentioned display device only when display is designated by an operator of the terminal for a digital network.

According to the present invention, the first position data is inputted from the input device, and the first image data for displaying the first mark on the display screen of the display device is subsequently generated. In addition, the second position data representing the position of the second mark is received through the digital network, and the second image data for displaying the second mark on the display screen of the display device is subsequently generated. The first image data and the second image data generated and the image data of one frame are synthesized, so that an image obtained by the synthesis is provided to the display device. Consequently, the marks and the one frame image are displayed on the display screen of the display device overlapped with each other.

According to the present invention, in the terminal for a digital network in which data communication is established through the digital network, the pointer (mark) operated by the operator of the terminal on the data transmission side and the pointer (mark) operated by the operator of the terminal on the data receiving side can be displayed on the display screen of the display device overlapped on an image. Consequently, the operators of the terminals on the data transmission side and on the data receiving side carry on a conversation with each other using the pointers displayed on the display screen while confirming the positions of the pointers as well as the image.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The foregoing and other objects, features, aspects and advantages of the present invention will become more apparent from the following detailed description of the present invention when taken in conjunction with the accompanying drawings, which are given by way of illustration only and thus are not limitative of the present invention, and wherein:

FIG. 3 is a flow chart showing the procedure for display of pointers on a monitor display device and receiving processing of data transmitted from another terminal.

DESCRIPTION OF THE PREFERRED EMBODIMENTS

Figure 1:
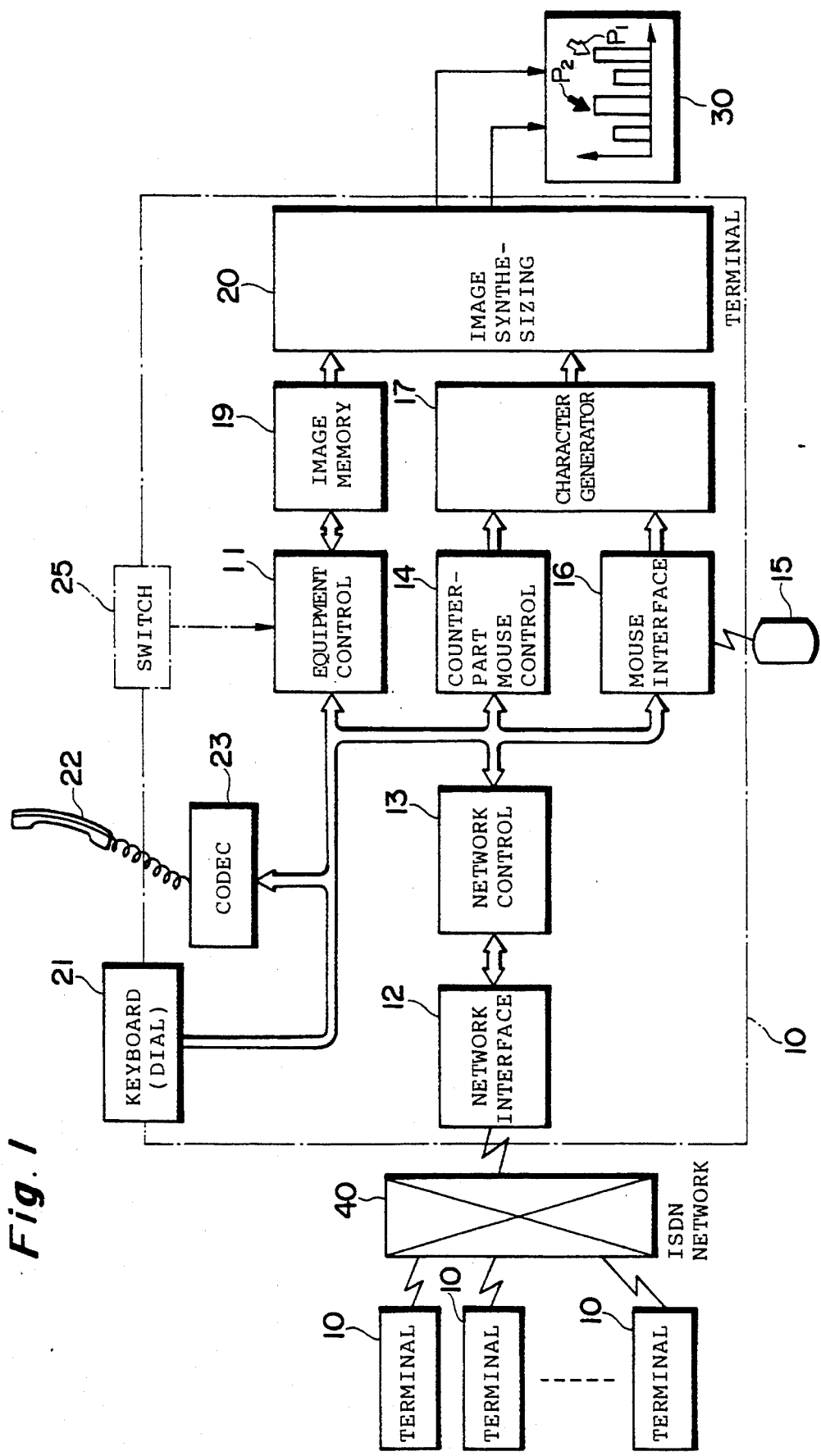
FIG. 1 is a block diagram illustrating an ISDN and terminals connected to the ISDN according to an embodiment of the present invention.

FIG. 1 is a block diagram illustrating an ISDN and terminals connected to the ISDN according to an embodiment of the present invention.

A plurality of terminals 10 are connected to an ISDN 40. The ISDN 40 allows transmission of data including image data between the plurality of terminals 10.

The whole operation of the terminals 10 is supervised by an equipment control portion (equipment control unit) 11. The equipment control portion 11 is preferably constituted by a CPU, a memory and the like.

A monitor display device 30 is connected to the terminal 10. An image represented by image data transmitted through the ISDN 40 is visually displayed on the monitor display device 30. Therefore, the terminal 10 comprises a network interface 12 for establishing data communication with the other terminals 10 through the ISDN 40, a network control portion (network control circuit) 13, and an image memory 19 for storing the image data.

The terminal 10 allows a pointer (mark) $P_1$ to be displayed on the image displayed on the monitor display device 30. A mouse 15 for designating the position where the pointer $P_1$ is to be displayed is connected to the terminal 10. The terminal 10 comprises a mouse interface 16 for reading a position signal representing the position designated by the mouse 15 and a character generator 17 for generating image data for displaying the pointer $P_1$ on the monitor display device 30.

Furthermore, the terminal 10 allows a pointer (mark) $P_2$ designated by an operator of another terminal 10 to be displayed on the monitor display device 30. The terminal 10 comprises a counterpart mouse control portion (control circuit or control unit) 14 for analyzing and determining a position for pointer $P_2$ on the image, as designated by a mouse connected to the other terminal 10 on the basis of the data sent through the ISDN 40. Image data for displaying the pointer $P_2$ designated by the mouse connected to the other terminal 10 is also generated by the character generator 17. The pointers $P_1$ and $P_2$ displayed on the display device 30 are so generated in the character generator 17 that they differ in color.

The terminal 10 further comprises a key board 21 operated by the operator for inputting a dial signal for calling the other terminal 10 to which data is to be transmitted, handset (a transmitter-receiver) 22, a CODEC (coder and decoder) 23 for converting an analog voice signal outputted from the handset 22 into digital voice data and converting digital voice data into an analog voice signal, and an image synthesizing portion (image synthesizing circuit or unit) 20 for synthesizing the image data and the data for displaying the pointers $P_1$ and $P_2$.

Figure 2:
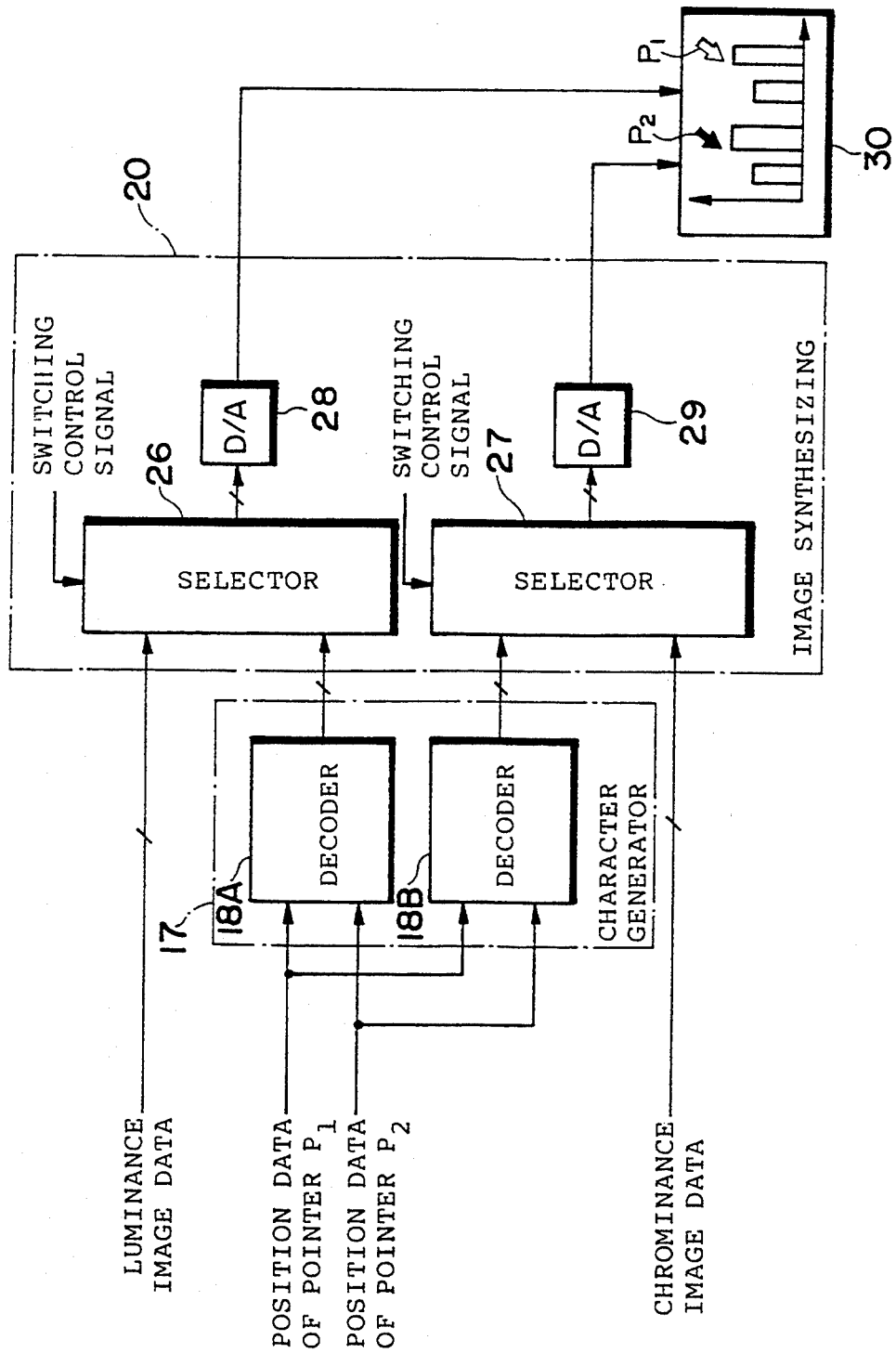
FIG. 2 is a block diagram illustrating an example of the construction of a character generator and an image synthesizing portion.

FIG. 2 is a block diagram illustrating an example of the construction of the character generator 17 and the image synthesizing portion 20 included in the terminal 10.

The character generator 17 comprises a Y decoder 18A for generating luminance data representing the pointers $P_1$ and $P_2$ and a C decoder 18B for generating chrominance data representing the pointers $P_1$ and $P_2$.

The image synthesizing portion 20 comprises a selector 26 for outputting either one of luminance image data and the luminance data representing the pointer $P_1$ or $P_2$ outputted from the Y decoder 18A, a selector 27 for outputting either one of chrominance image data and the chrominance data representing the pointer $P_1$ or $P_2$ outputted from the C decoder 18B, a digital-to-analog converting circuit 28 for converting the luminance data outputted from the selector 26 into an analog luminance signal, and a digital-to-analog converting circuit 29 for converting the chrominance data outputted from the selector 27 into an analog chrominance signal.

The data representing the position of the pointer $P_1$ outputted from the mouse interface 16 is applied to the Y decoder 18A and the C decoder 18B, so that the luminance data and the chrominance data representing the pointer $P_1$ are generated and are respectively applied to the selectors 26 and 27. The luminance image data and the chrominance image data outputted from the image memory 19 are respectively applied to the selectors 26 and 27. The selectors 26 and 27 are so switched by a switching control signal that they respectively select the data outputted from the Y decoder 18A and the C decoder 18B in a place (pixels on the display screen) where the pointer $P_1$ is displayed. The selectors 26 and 27 respectively select the luminance data and the chrominance data outputted from the image memory 19 in a place other than the place where the pointer $P_1$ is displayed.

The data representing the position of the pointer $P_2$ controlled by the other terminal 10 is also applied to the Y decoder 18A and the C decoder 18B, so that the luminance data and the chrominance data representing the pointer $P_2$ are generated and are respectively applied to the selectors 26 and 27. The selectors 26 and 27 are so switched by the switching control signal that they respectively select the data outputted from the Y decoder 18A and the C decoder 18B in a place where the pointer $P_2$ is displayed.

The luminance data outputted from the selector 26 is applied to the digital-to-analog converting circuit 28, to be converted into an analog luminance signal. The analog luminance signal is applied to the monitor display device 30. The chrominance data outputted from the selector 27 is applied to the digital-to-analog converting circuit 29, to be converted into an analog chrominance signal. The analog chrominance signal is applied to the monitor display device 30.

The position data representing the position of the pointer $P_1$ (and $P_2$) is one type of image data expressing an image representing the pointer $P_1$ (and $P_2$) by one bit (1 or 0) per one pixel in synchronization with the reading of the image data from the image memory 19. In this case, the decoder 18A or 18B converts the inputted position data into luminance data (at a white level or a black level or at a suitable gray level) or chrominance data (representing a suitable color). The switching control signal for switching the selectors 26 and 27 is the same as the position data representing the position of the pointer $P_1$ or $P_2$.

When the position data red, resenting the position of the pointer $P_1$ (and $P_2$) represents the position on the screen of a predetermined point of the pointer $P_1$ (and $P_2$) (for example, the center or a typical point of an image of the pointer), the decoders 18A and 18B will respectively generate luminance image data and chrominance image data representing the image of the pointer $P_1$ (and $P_2$) on the basis of the position data. The switching control signal will be equivalent to one type of image data expressing the image of the pointer by one bit per one pixel.

FIG. 3 is a flow chart showing the procedure for display of pointers on the display screen of the monitor display device 30 and receiving processing of data transmitted from the other terminal 10.

When the terminal 10 is called by the operator of the other terminal 10 via operation of a keyboard included in the other terminal 10, the terminal 10 is connected to the other terminal 10 through the ISDN 40.

When the terminal 10 is connected to the other terminal 10, it is possible to carry on a conversation with the operator of the other terminal 10 and to transmit and receive image data.

If image data sent from the other terminal 10 through the ISDN 40 is received when the mouse 15 is not operated (step 56 after NO in the step 51 and YES in the step 55), the received image data is stored once in the image memory 19 through the network interface 12, the network control portion 13, and the equipment control portion 11. The image data stored once in the image memory 19 is read out under the control of the equipment control portion 11 and is applied to the monitor display device 30 through the image synthesizing circuit 20, to be visually displayed (step 59).

The operator of the terminal 10 may, in some cases, carry on a conversation with the operator of the other terminal 10 using the handset 22 while viewing an image represented by the received image data and displayed on the monitor display device 30. In this terminal 10, when a conversation is carried on while watching the image displayed on the monitor display device 30, the conversation can be carried on while designating a particular position on the display screen and confirming the position as well as the image. The position is designated by a pointer displayed on the display screen of the display device 30 through the operation of the mouse 15.

When the mouse 15 is operated by the operator of the terminal 10, a signal representing the position of a pointer $P_1$ designated by the mouse 15 is applied to the character generator 17 through the mouse interface 16. Luminance data and chrominance data of the pointer $P_1$ are respectively generated by the Y decoder 18A and the C decoder 18B included in the character generator 17. If no image data is transmitted from the terminal 10 to the other terminal 10 (NO in the step 52), the luminance data and the chrominance data generated are respectively converted into an analog luminance signal and an analog chrominance signal in the digital-to-analog converting circuits 28 and 29 through the selectors 26 and 27, to be applied to the monitor display device 30. Consequently, the pointer $P_1$ is displayed as overlapped on the image displayed on the monitor display device 30 (step 53).

Furthermore, position data representing the position of the pointer $P_1$ designated by the mouse 15 is transmitted through the network control portion 13 and the network interface 12, to be applied to the other terminal 10 through the ISDN 40 (step 54). Consequently, the pointer $P_1$ designated by the mouse 15 is displayed on a monitor connected to the other terminal 10.

A pointer $P_2$ designated by the other terminal 10 can be also displayed on the monitor display device 30 connected to the terminal 10.

Position data representing the position of the pointer $P_2$ designated by the operator of the other terminal 10 is received through the network interface 12 and the network control portion 13 and is applied to the counterpart mouse control portion 14 (position data and YES respectively in the step 55, and YES in the steps 56 and 57). The position of the pointer $P_2$ designated in the other terminal 10 is detected by the counterpart mouse control portion 14 from the received position data.

The data representing the position of the pointer $P_2$ is applied to the Y decoder 18A and the C decoder 18B, to generate luminance data and chrominance data. The chrominance data representing the pointer $P_2$ differs in color from the chrominance data representing the pointer $P_1$ because the pointers $P_1$ and $P_2$ are displayed on the display screen of the display device 30 in different colors. The luminance data and the chrominance data generated respectively pass through the selectors 26 and 27 at the time point corresponding to the position, where the pointer $P_2$ is displayed, on the screen of the display device 30, and are respectively converted into analog signals by the analog-to-digital converting circuits 28 and 29, to be applied to the monitor display device 30. Consequently, the pointer $P_2$ which differs in color from the pointer $P_1$ is displayed on the display screen of the monitor display device 30 (step 58).

It is thus possible to display on the display screen of the monitor display device 30 the pointer $P_1$ designated by operating the mouse 15 connected to the terminal 10 on this side and the pointer $P_2$ designated by the operator of the other terminal 10 on the other side overlapped on the displayed image.

Furthermore, the pointer $P_1$ and the pointer $P_2$ which are displayed on the monitor display device 30 can be distinguished without being confused because they differ in color.

If the mouse 15 is operated to move the pointer, the pointer is rewritten and is moved in accordance with the operation (steps 53 and 58). If the image data is being transmitted (YES in the step 52), however, the pointer $P_1$ is not rewritten until the transmission is terminated.

Although in the above-mentioned embodiment, the pointer $P_1$ designated by the mouse 15 connected to the terminal 10 and the pointer $P_2$ designated in the other terminal 10 are distinguished by the difference in color, the pointers $P_1$ and $P_2$ may be distinguished by the difference in shape.

Additionally, the pointers $P_1$ and $P_2$ displayed on the monitor display device 30 may be always displayed while the terminal 10 is connected to the other terminal 10. Alternatively, the terminal 10 may be provided with a pointer display switch 25 to display pointers on the monitor display device only when they are set by the pointer display switch 25.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A terminal for a digital network comprising:
    display means for displaying on a display screen an image and first and second marks respectively designating independent first and second positions on the image;
    input means for inputting first position data representing the first position of said first mark on the display screen of said display means;

first image data generating means for generating first image data for displaying said first mark on the display screen of said display means based only on the first position data inputted via said input means;

receiving means for receiving through the digital network image data of one frame and second position data representing the second position of said second mark on the display screen of said display means;

second image data generating means for generating second image data for displaying said second mark on the display screen of said display means based only on the second position data received by said receiving means; and image data synthesizing means for synthesizing said image data of one frame received by said receiving means, said first image data generated by said first image data generating means, and said second image data generated by said second image data generating means and for displaying an image obtained by the synthesis as a composite image on said display means.

2. The terminal for a digital network according to claim 1, wherein said first mark and said second mark differ in shape.

3. The terminal for a digital network according to claim 1, comprising:

a designating switch for designating display and erasing of said first mark and said second mark displayed on the display screen of said display means; and control means for carrying out such control as to display said first mark and said second mark on the display screen of said display means only when said designating switch designates display.

4. The terminal for a digital network according to claim 1, wherein said first mark and said second mark differ in color.

5. The terminal for a digital network according to claim 1, further comprising voice communication means, coupled to said receiving means, for providing voice communication capability over the digital network.

6. The terminal for a digital network according to claim 1, wherein said image data synthesizing means comprises luminance decoding means and chrominance decoding means for converting said first and second image data respectively into first and second color image data to display said first and second marks in color.

7. A method of controlling a terminal of a digital network, the terminal having display means for displaying on a display screen an image and first and second marks respectively designating independent first and second positions on the image, the method comprising the steps of:

receiving first position data, inputted via operator input means of the terminal, which represents the first position of said first mark on the display screen of said display means;

generating first image data for displaying said first mark on the display screen of said display means based only on the first position data inputted via the operator input means;

receiving through the digital network image data of one frame and second position data representing the second position of said second mark on the display screen of said display means;

generating second image data for displaying said second mark on the display screen of said display means based only on the second position data received through the digital network; and synthesizing said image data of one frame, said first image data for displaying said first mark, and said second image data for displaying said second mark and for displaying an image obtained by the synthesis as a composite image on said display means.

8. The method according to claim 7, wherein said first mark and said second mark differ in shape.

9. The method according to claim 7, wherein said first mark and said second mark are displayed on the display screen of said display means only when the operator of the terminal designates display.

10. The method according to claim 7, wherein said first and second mark differ in color.

* * * * *